United States Patent
Parker et al.

(10) Patent No.: US 12,298,378 B2
(45) Date of Patent: May 13, 2025

(54) COUNTER UNMANNED AERIAL SYSTEM WITH NAVIGATION DATA TO INTERCEPT AND/OR DISABLE AN UNMANNED AERIAL VEHICLE THREAT

(71) Applicant: XiDrone Systems, Inc., Naples, FL (US)

(72) Inventors: Dwaine A. Parker, Naples, FL (US); Damon E. Stern, Riverview, FL (US); Lawrence S. Pierce, Huntsville, AL (US)

(73) Assignee: XiDrone Systems, Inc., Naples, FL (US)

( * ) Notice: Subject to any disclaimer, the term of this patent is extended or adjusted under 35 U.S.C. 154(b) by 0 days.

(21) Appl. No.: 17/484,521

(22) Filed: Sep. 24, 2021

(65) Prior Publication Data
US 2022/0011422 A1 Jan. 13, 2022

Related U.S. Application Data

(63) Continuation of application No. 17/001,254, filed on Aug. 24, 2020, now Pat. No. 11,156,707, which is a (Continued)

(51) Int. Cl.
*G01S 13/06* (2006.01)
*B64U 101/30* (2023.01)
(Continued)

(52) U.S. Cl.
CPC .............. *G01S 13/06* (2013.01); *F41H 11/02* (2013.01); *F41H 13/0075* (2013.01);
(Continued)

(58) Field of Classification Search
CPC ........................................................ G01S 13/06
See application file for complete search history.

(56) References Cited

U.S. PATENT DOCUMENTS

| 3,668,403 A | 6/1972 | Meilander |
| 3,754,249 A | 8/1973 | Kearney, II |
| (Continued) | | |

FOREIGN PATENT DOCUMENTS

| DE | 102015008296 B4 | 8/2017 |
| FR | 2983973 | 6/2013 |
| (Continued) | | |

OTHER PUBLICATIONS

Beaudoin, Laurent, Potential Threats of UAS Swarms and the Countermeasure's Need, Hal Open Science, European Conference on Information Warfare and Security (ECIW), 2011, Tallinn, Estonia. ffhal-01132236f (https://hal.science/hal-01132236/document)(hereinafter "Beaudoin"). (Year: 2011).*

(Continued)

*Primary Examiner* — Jean Paul Cass
(74) *Attorney, Agent, or Firm* — Nixon & Vanderhye P.C.

(57) ABSTRACT

A system for providing integrated detection and countermeasures against unmanned aerial vehicles include a detecting element, a location determining element and an interdiction element. The detecting element detects an unmanned aerial vehicle in flight in the region of, or approaching, a property, place, event or very important person. The location determining element determines the exact location of the unmanned aerial vehicle. The interdiction element can either direct the unmanned aerial vehicle away from the property, place, event or very important person in a non-destructive manner, or can cause disable the unmanned aerial vehicle in a destructive manner.

22 Claims, 4 Drawing Sheets

Related U.S. Application Data continuation of application No. 16/362,285, filed on Mar. 22, 2019, now Pat. No. 10,795,010, which is a continuation of application No. 15/967,291, filed on Apr. 30, 2018, now Pat. No. 10,281,570, which is a continuation of application No. 15/598,112, filed on May 17, 2017, now Pat. No. 9,977,117, which is a continuation of application No. 14/821,907, filed on Aug. 10, 2015, now Pat. No. 9,689,976.

(60) Provisional application No. 62/094,154, filed on Dec. 19, 2014.

(51) Int. Cl.

| | | |
|---|---|---|
| *F41H 11/02* | (2006.01) | |
| *F41H 13/00* | (2006.01) | |
| *G01S 3/782* | (2006.01) | |
| *G01S 7/02* | (2006.01) | |
| *G01S 7/38* | (2006.01) | |
| *G01S 7/41* | (2006.01) | |
| *G01S 13/42* | (2006.01) | |
| *G01S 13/86* | (2006.01) | |
| *G01S 13/88* | (2006.01) | |
| *G01S 13/933* | (2020.01) | |
| *G05D 1/00* | (2024.01) | |
| *G08G 5/22* | (2025.01) | |
| *G08G 5/26* | (2025.01) | |
| *G08G 5/55* | (2025.01) | |
| *G08G 5/59* | (2025.01) | |

(52) U.S. Cl.
CPC .............. *G01S 3/782* (2013.01); *G01S 7/021* (2013.01); *G01S 7/38* (2013.01); *G01S 7/414* (2013.01); *G01S 13/42* (2013.01); *G01S 13/86* (2013.01); *G01S 13/88* (2013.01); *G05D 1/0022* (2013.01); *G08G 5/22* (2025.01); *G08G 5/26* (2025.01); *G08G 5/55* (2025.01); *G08G 5/59* (2025.01); *B64U 2101/30* (2023.01); *B64U 2201/10* (2023.01); *G01S 13/883* (2013.01); *G01S 13/933* (2020.01)

(56) References Cited

U.S. PATENT DOCUMENTS

| | | | |
|---|---|---|---|
| 3,981,010 | A | 9/1976 | Michelsen |
| 4,016,565 | A | 4/1977 | Walker |
| 4,178,596 | A | 12/1979 | Rowlett |
| 4,468,656 | A | 8/1984 | Clifford |
| 4,652,885 | A | 3/1987 | Saffold |
| 4,698,638 | A | 10/1987 | Branigan |
| 4,723,311 | A | 2/1988 | Moustakas et al. |
| 4,727,537 | A | 2/1988 | Nichols |
| 4,746,924 | A | 5/1988 | Lighfoot |
| 4,780,719 | A | 10/1988 | Frei |
| 4,825,435 | A | 4/1989 | Amundsen et al. |
| 4,990,814 | A | 2/1991 | Tanski et al. |
| 5,005,147 | A | 4/1991 | Krishen |
| 5,187,485 | A | 2/1993 | Tsui |
| 5,268,680 | A | 12/1993 | Zantos |
| 5,307,077 | A | 4/1994 | Branigan |
| 5,327,149 | A | 7/1994 | Kuffer |
| 5,341,142 | A | 8/1994 | Reis |
| 5,381,150 | A | 1/1995 | Hawkins |
| 5,402,129 | A | 3/1995 | Gellner |
| 5,442,168 | A | 8/1995 | Gurner et al. |
| 5,554,990 | A | 9/1996 | McKinney |
| 5,557,278 | A | 9/1996 | Piccirillo |
| 5,728,965 | A | 3/1998 | Fesland |
| 5,884,040 | A | 3/1999 | Chung |
| 5,930,696 | A | 7/1999 | Tzuang |
| 5,996,646 | A | 10/1999 | Lampe et al. |
| 6,081,764 | A | 6/2000 | Varon |
| 6,087,974 | A | 7/2000 | Yu |
| 6,262,679 | B1 | 7/2001 | Tran |
| 6,529,820 | B2 | 3/2003 | Tomescu |
| 6,563,453 | B1 | 5/2003 | Wilson |
| 6,564,149 | B2 | 5/2003 | Lai |
| 6,690,296 | B2 | 2/2004 | Corwin |
| 6,697,008 | B1 | 2/2004 | Sternowski |
| 6,707,052 | B1 | 3/2004 | Wild |
| 6,868,314 | B1 | 3/2005 | Frink |
| 6,877,691 | B2 | 4/2005 | DeFlumere |
| 6,903,676 | B1 | 6/2005 | Frady |
| 6,992,614 | B1 | 1/2006 | Joyce |
| 7,202,809 | B1 | 4/2007 | Schade |
| 7,205,932 | B2 | 4/2007 | Fiore |
| 7,236,766 | B2 | 6/2007 | Freeburg |
| 7,283,840 | B2 | 10/2007 | Cho |
| 7,336,939 | B2 | 2/2008 | Gomez |
| 7,339,981 | B2 | 3/2008 | Dogan |
| 7,437,225 | B1 | 10/2008 | Rathinam |
| 7,492,308 | B2 | 2/2009 | Benayahu |
| 7,504,982 | B2 | 3/2009 | Berg |
| 7,542,828 | B2 | 6/2009 | Steele |
| 7,548,184 | B2 | 6/2009 | Lo |
| 7,551,121 | B1 | 6/2009 | O'Connell |
| 7,567,202 | B2 | 7/2009 | Pearson et al. |
| 7,593,706 | B2 | 9/2009 | Bucknor et al. |
| 7,619,555 | B2 | 11/2009 | Rolfe |
| 7,683,782 | B2 | 3/2010 | Christopher |
| 7,684,020 | B1 | 3/2010 | Marti et al. |
| 7,728,755 | B1 | 6/2010 | Jocic |
| 7,782,256 | B2 | 8/2010 | Smith |
| 7,853,261 | B1 | 12/2010 | Lewis et al. |
| 7,898,454 | B1 | 3/2011 | Starkey |
| 7,961,133 | B2 | 6/2011 | Vollin |
| 8,161,440 | B2 | 4/2012 | Lontka |
| 8,204,494 | B2 | 6/2012 | Weinzieri |
| 8,212,709 | B2 | 7/2012 | Bradley |
| 8,258,994 | B2 | 9/2012 | Hamilton |
| 8,258,998 | B2 | 9/2012 | Factor |
| 8,305,196 | B2 | 11/2012 | Kennedy et al. |
| 8,330,641 | B2 | 12/2012 | Ryden |
| 8,375,837 | B2 | 2/2013 | Goossen |
| 8,378,880 | B2 | 2/2013 | Baka |
| 8,378,881 | B2 | 2/2013 | LeMire |
| 8,429,655 | B2 | 4/2013 | Yun |
| 8,464,949 | B2 | 6/2013 | Namey |
| 8,483,703 | B2 | 7/2013 | Swope et al. |
| 8,543,053 | B1 | 9/2013 | Melamed et al. |
| 8,543,265 | B2 | 9/2013 | Ekhaguere |
| 8,655,348 | B2 | 2/2014 | Zha |
| 8,750,903 | B1 | 6/2014 | Fitzsimmons et al. |
| 8,761,687 | B2 | 6/2014 | Chang et al. |
| 8,798,922 | B2 | 8/2014 | Tillotson |
| 8,824,966 | B2 | 9/2014 | Boes |
| 8,909,304 | B1 | 12/2014 | Coleman |
| 9,041,798 | B1 | 5/2015 | Yerkes |
| 9,048,944 | B2 | 6/2015 | Boes |
| 9,085,362 | B1 | 7/2015 | Kilian |
| 9,170,069 | B1 | 10/2015 | Smith |
| 9,175,934 | B1 | 11/2015 | Kilian |
| 9,204,488 | B2 | 12/2015 | Bai |
| 9,212,869 | B1 | 12/2015 | Boardman |
| 9,246,629 | B2 | 1/2016 | Coleman |
| 9,405,005 | B1 | 8/2016 | Arteaga |
| 9,495,877 | B2 | 11/2016 | Duffy |
| 9,508,264 | B2 | 11/2016 | Chan |
| 9,524,648 | B1 * | 12/2016 | Gopalakrishnan .... G06F 21/554 |
| 9,529,360 | B1 | 12/2016 | Melamed et al. |
| 9,677,852 | B2 | 6/2017 | Tikochinski |
| 9,689,976 | B2 | 6/2017 | Parker |
| 9,715,009 | B1 | 7/2017 | Parker |
| 9,854,556 | B2 | 12/2017 | Skaaksrud |
| 9,971,021 | B2 | 5/2018 | Moses et al. |
| 9,977,117 | B2 | 5/2018 | Parker |
| 10,156,631 | B2 | 5/2018 | Parker |
| 9,995,819 | B1 | 6/2018 | Akhund |
| 10,122,736 | B2 | 11/2018 | Baxley et al. |
| 10,281,570 | B2 | 5/2019 | Parker |

(56) References Cited

U.S. PATENT DOCUMENTS

| | | | |
|---|---|---|---|
| 10,572,851 B2 | 2/2020 | Skaaksrud | |
| 10,771,993 B2 | 9/2020 | Althoff | |
| 10,782,097 B2 | 9/2020 | Hall | |
| 10,788,588 B2 | 9/2020 | Ferguson | |
| 11,064,363 B2 | 7/2021 | Fox et al. | |
| 2002/0190891 A1 | 12/2002 | Viana et al. | |
| 2003/0174763 A1 | 9/2003 | Kouki | |
| 2004/0021852 A1 | 2/2004 | DeFlumere | |
| 2004/0057537 A1 | 3/2004 | Kim | |
| 2004/0130488 A1 | 7/2004 | DeChamplain | |
| 2004/0166878 A1 | 8/2004 | Erskine et al. | |
| 2004/0203748 A1 | 10/2004 | Kappes et al. | |
| 2004/0249519 A1 | 12/2004 | Frink | |
| 2005/0040909 A1 | 2/2005 | Waight | |
| 2005/0108374 A1 | 5/2005 | Pierzga | |
| 2006/0028373 A1* | 2/2006 | Fullerton | F41H 11/00 342/67 |
| 2006/0028374 A1 | 2/2006 | Fullerton | |
| 2006/0063485 A1 | 3/2006 | Gainey et al. | |
| 2006/0092075 A1 | 5/2006 | Bruce | |
| 2006/0106506 A1 | 5/2006 | Nichols | |
| 2006/0164282 A1 | 7/2006 | Duff | |
| 2006/0175464 A1 | 8/2006 | Chang | |
| 2006/0188033 A1 | 8/2006 | Zehavi et al. | |
| 2007/0052580 A1 | 3/2007 | Fiore | |
| 2007/0060055 A1 | 3/2007 | Desai et al. | |
| 2007/0099667 A1 | 5/2007 | Graham et al. | |
| 2007/0226247 A1 | 9/2007 | Ferm | |
| 2007/0285280 A1 | 12/2007 | Robinson et al. | |
| 2008/0018519 A1 | 1/2008 | Berg | |
| 2008/0088508 A1 | 4/2008 | Smith | |
| 2008/0191924 A1 | 8/2008 | Duff | |
| 2009/0061870 A1 | 3/2009 | Finklestein et al. | |
| 2009/0098847 A1 | 4/2009 | Noujeim | |
| 2009/0174589 A1 | 7/2009 | Moraites | |
| 2009/0273504 A1 | 11/2009 | Meyers | |
| 2009/0292468 A1 | 11/2009 | Wu | |
| 2010/0010793 A1 | 1/2010 | Herman | |
| 2010/0042269 A1 | 2/2010 | Kokkeby | |
| 2010/0082180 A1 | 4/2010 | Wright et al. | |
| 2010/0170383 A1 | 7/2010 | Wilner | |
| 2010/0174475 A1 | 7/2010 | Estkowski | |
| 2010/0253567 A1 | 10/2010 | Factor | |
| 2010/0272012 A1 | 10/2010 | Knefelkkamp | |
| 2010/0315281 A1 | 12/2010 | Askelson | |
| 2011/0002687 A1 | 1/2011 | Sabat, Jr. et al. | |
| 2011/0117870 A1 | 5/2011 | Pera | |
| 2011/0267222 A1 | 11/2011 | Craig | |
| 2012/0092208 A1 | 4/2012 | LeMire | |
| 2012/0143482 A1 | 6/2012 | Goossen | |
| 2012/0170024 A1 | 7/2012 | Azzazy | |
| 2012/0170029 A1 | 7/2012 | Azzazy | |
| 2012/0192707 A1 | 8/2012 | Rogers | |
| 2012/0211562 A1 | 8/2012 | Cook | |
| 2012/0217301 A1 | 8/2012 | Namey | |
| 2012/0235881 A1 | 9/2012 | Pan | |
| 2012/0299765 A1 | 11/2012 | Huang et al. | |
| 2012/0309288 A1 | 12/2012 | Lu | |
| 2012/0322459 A1 | 12/2012 | Jaffri et al. | |
| 2013/0023201 A1 | 1/2013 | Coleman et al. | |
| 2013/0157599 A1 | 6/2013 | Ray | |
| 2013/0244712 A1 | 9/2013 | Kuzio et al. | |
| 2013/0297271 A1 | 11/2013 | Herman | |
| 2013/0316659 A1 | 11/2013 | Ylamurto | |
| 2013/0321199 A1 | 12/2013 | Suwa | |
| 2014/0102288 A1 | 4/2014 | Yeshurun | |
| 2014/0111372 A1 | 4/2014 | Wu | |
| 2014/0138474 A1 | 5/2014 | Sharpin | |
| 2014/0200875 A1 | 7/2014 | Yuseki | |
| 2014/0209678 A1 | 7/2014 | Factor | |
| 2014/0251123 A1 | 9/2014 | Venema | |
| 2014/0253378 A1 | 9/2014 | Hinman | |
| 2014/0257692 A1 | 9/2014 | Stefani | |
| 2014/0266851 A1* | 9/2014 | Fink | G01S 7/021 342/14 |
| 2014/0269650 A1 | 9/2014 | Sahota | |
| 2014/0277854 A1 | 9/2014 | Jones | |
| 2015/0133067 A1 | 5/2015 | Chang et al. | |
| 2015/0210359 A1 | 7/2015 | Mcclure | |
| 2015/0214926 A1 | 7/2015 | Tohidian et al. | |
| 2015/0226834 A1 | 8/2015 | Floch | |
| 2015/0229434 A1 | 8/2015 | Shawn | |
| 2015/0254988 A1 | 9/2015 | Wang | |
| 2015/0302858 A1 | 10/2015 | Hearing | |
| 2015/0304783 A1 | 10/2015 | Yang et al. | |
| 2015/0304869 A1 | 10/2015 | Johnson | |
| 2015/0312835 A1 | 10/2015 | Subramanian | |
| 2015/0350914 A1* | 12/2015 | Baxley | H04W 72/20 726/11 |
| 2015/0370250 A1 | 12/2015 | Bachrach | |
| 2016/0023760 A1 | 1/2016 | Goodrich | |
| 2016/0025850 A1 | 1/2016 | Rigsby | |
| 2016/0117931 A1 | 4/2016 | Chan | |
| 2016/0245907 A1 | 8/2016 | Parker et al. | |
| 2016/0327956 A1 | 11/2016 | Zhang | |
| 2016/0358483 A1 | 12/2016 | Park | |
| 2017/0039413 A1 | 2/2017 | Nadler | |
| 2017/0069214 A1 | 3/2017 | Dupray | |
| 2017/0076610 A1* | 3/2017 | Liu | G08G 5/22 |
| 2017/0092138 A1 | 3/2017 | Trundle et al. | |
| 2017/0094527 A1 | 3/2017 | Shattil | |
| 2017/0148332 A1 | 5/2017 | Ziemba | |
| 2017/0148467 A1 | 5/2017 | Franklin | |
| 2017/0219676 A1 | 8/2017 | Tran | |
| 2017/0261613 A1 | 9/2017 | Van Voorst | |
| 2017/0308085 A1 | 10/2017 | Hall | |
| 2017/0372617 A1* | 12/2017 | Bruno | G06Q 10/00 |
| 2018/0038675 A1 | 2/2018 | Graswald | |
| 2018/0128895 A1 | 5/2018 | Seeber | |
| 2018/0129882 A1 | 5/2018 | Seeber | |
| 2018/0162502 A1 | 6/2018 | McClure | |
| 2019/0271781 A1* | 9/2019 | Fink | G01S 7/36 |
| 2019/0360783 A1 | 11/2019 | Whittaker | |
| 2020/0008059 A1 | 1/2020 | Fox et al. | |
| 2020/0043346 A1 | 2/2020 | Vacek | |
| 2020/0233091 A1* | 7/2020 | Fink | G01S 19/215 |
| 2020/0301426 A1 | 9/2020 | Bullock | |
| 2021/0092604 A1 | 3/2021 | Fox et al. | |

FOREIGN PATENT DOCUMENTS

| | | | |
|---|---|---|---|
| GB | 2536043 | | 6/2016 |
| GB | 2536043 A * | 9/2016 | ............ G01S 13/86 |
| RU | 72753 U1 * | 4/2008 | |
| RU | 72754 | | 4/2008 |
| RU | 2551821 C1 | 5/2015 | |
| WO | 2017040254 A1 | 3/2017 | |
| WO | 2019067627 A1 | 4/2019 | |
| WO | WO 2013/130518 A1 * | 3/2022 | |

OTHER PUBLICATIONS

Molchanov et al., "Classification of small UAVs and birds by micro-Doppler signatures", International Journal of Microwave and Wireless Technologies, 2014, pp. 435-444, Cambridge University Press and the European Microwave Association (10 pages).

Birch et al., "UAS Detection, Classification, and Neutralization: Market Survey 2015", Sandia National Laboratories, Sandia Report, SAND2015-6365, Unlimited Release, 2015, pp. 1-74.

Final Office Action dated Mar. 2, 2021 in U.S. Appl. No. 17/001,254, filed Aug. 24, 2020.

U.S. Notice of Allowance dated Jun. 24, 2021 in commonly assigned U.S. Appl. No. 17/001,254 (42 pages).

N9310A RF Signal Generator, 9kHz to 3 GHZ, Key Features & Specifications, Keysight Technologies {1994), retrieved Nov. 14, 2017, 2 pages.

Smart Sensor Radar System, Vista Radar Systems {1994), Raven Aerostar, Product Overview, retrieved Nov. 14, 2017, 2 pages.

WiNRADiO MS-8118/G3 Multichannel Radio Monitoring System (1994), Product Overview, retrieved Nov. 14, 2017, 2 pages.

RF Power Amplifiers, High Power-6GHz and below, Empower RF Systems, Inc. {1994), retrieved Nov. 14, 2017, 1 page.

(56) References Cited

OTHER PUBLICATIONS

WiNRADiO WD-3300 High Performance Portable Direction Finding System (1994), Product Overview, retrieved Nov. 14, 2017, 2 pages.
International Preliminary Report on Patentability and Written Opinion of the International Searching Authority dated Jun. 29, 2017, issued in related International Application No. PCT/US2015/059698.
Kems, Andrew J., et al., "Unmanned Aircraft Capture and Control via GPS Spoofing," Journal of Robotics, vol. 31, No. 4, Jul. 2014, 29 pages.
Rassler, Don, "Remotely Piloted Innovation: Terrorism, Drones and Supportive Technology," Combating Terrorism Center at West Point, United States Military Academy, Oct. 2016, 77 pages.
Ying, Gao, et al., "Design and Realization of Virtual Scene System in UAV Electronic Warfare," International Conference on Information Engineering and Computer Science, IEEE, 2009,4 pages.
"In the battle for Mosul, grenades rain down from ISIS drones," Rudaw, Jan. 7, 2017, 3 pages.
"Liteye and Tribalco Team to Deliver AUDS Counter Drone Systems to U.S. Military Customers," PR Newswire, Jan. 12, 2017, 3 pages.
Watson, Ben, "The Drones of ISIS," Defense One, Jan. 12, 2017, 10 pages.
Office Action dated Apr. 4, 2017, issued in related U.S. Appl. No. 14/821,907.
Notice of Allowance and Fee(s) Due dated May 15, 2017, issued in related U.S. Appl. No. 14/821,907.
Muraru, Adrian, "An Overview on the Concept of UAV Survivability", International Conference of Scientific Paper Afases 2011, pp. 1231-1236 (May 26-28, 2011) (6 pages).
Tham, Kine Seng, "Enhancing combat survivability of existing unmanned aircraft systems", Calhoun Institutional Archive of the Naval Postgraduate School (Dec. 2008) (150 pages).
Sanders, Christopher P., "Real-time Collision Avoidance for Autonomous Air Vehicles", MS Thesis, Massachusetts Institute of Technology (Jan. 1998) (156 pages).
Tso et al, "A Multi-Agent Operator Interface for Unmanned Aerial Vehicles, Proceedings of the 18th Digital Avionics Systems Conference", vol. 2 (Oct. 24-29, 1999) (17 pages).
Kaminski, Margot E., "Drone Federalism: Civilian Drones and the Things They Carry", California Law Review Circuit, vol. 4, No. 57, pp. 57-74 (May 2013) (19 pages).
Elias, Bart, "Pilotless Drones: Background and Considerations for Congress Regarding Unmanned Aircraft Operations in the National Airspace System", Congressional Research Service, pp. 1-21 (Sep. 10, 2012) (24 pages).
Samland et al., "AR.Drone: security threat analysis and exemplary attack to track persons", Proceedings of SPIE—The International Society for Optical Engineering 8301:15 (Jan. 2012) DOI:10.1117/12.902990 (15 pages).
Albanesius, Chloe, "SkyJack' Software Finds and Hijacks Drones" PC Magazine (Dec. 4, 2013) (1 page).
Teschler, Lee, "You knew this was coming: Hacker figures out how to skyjack drones", MachineDesign (Dec. 9, 2013) (1 page).
Austin, Reg, "Unmanned Aircraft Systems: UAVs Design, Development and Deployment", pp. 1-332 (John Wiley and Sons, Ltd., 2010) (365 pages).
Pleban et al., "Hacking and securing the AR.Drone 2.0 quadcopter—Investigations for improving the security of a toy", Proceedings of SPIE—The International Society for Optical Engineering (Jan. 2014) DOI:10.1117/12.2044868.
Beel, Joseph J., "Anti-UAV Defense Requirements for Ground Forces and Hypervelocity Rocket Lethality Models", Naval Postgraduate School, Thesis (Mar. 1992) (122 pages).
Agbeyibor, Richard C., "Secure ADS-B: Towards Airborne Communications Security in the Federal Aviation Administration's Next Generation Air Transportation System", Air Force Institute of Technology (Mar. 14, 2014) (105 pages).
Wesson et al., "Unhackable Drones: the Challenges of Securely Integrating Unmanned Aircraft Into the National Airspace" (Apr. 1, 2013) (7 pages).
Memorandum Opinion and Order, *XiDrone Systems, Inc.* vs. *911 Security Inc.*, Civil Action No. 3:21-CV-2669-N, Sep. 27, 2022 (9 pages).
https://web.archive.org/web/20141101031543/http:/enrgies.com/index.php?option=com_content&view=article&id=115&Itemid=145 (2014).
https://web.archive.org/web/20141031131138/http:/enrgies.com/index.php?option=com_content&view=article&id=119&Itemid=149 (2104).
The Forward Area Air Defense Command and Control (FAAD C2) https://www.dacis.com/budget/budget_pdf/FY15/RDTE/A/0604741A_96.pdf.
Docket for *XiDrone Systems* v. *Fortem Technologies*, Case No. 2:23-cv-00430-HCN-DBP, US District Court for District of Utah.
"Blighter Anti-UAV Defence Systems (AUDS)", Blighter Surveillance Systems Ltd, 3 pages, Sep. 3, 2015.
Youtube Video, "AUDS—Anti-UAV Defence System", Blighter Surveillance Systems Ltd, https://youtu.be/P8aZ0zWX3SA?si=nJ47yUQQxU1kcNxs (May 11, 2015, page retrieved recently).
Youtube channel, https://www.youtube.com/@Blighter "Blighter Surveillance Systems Ltd" (2024).
Groves, "Principles of GNSS, Inertial, and Multisensor Integrated Navigation Systems" Second Edition, pp. 1-22 GNSS Technology and Applications Series (Artech House 2013).
"AUDS Anti-UAV Defence System Strategic Counter-UAS Systems", Blighter Surveillance Systems Ltd, AUDS-0103 8 pages (Sep. 2017).
"Blighter AUDS (Anti UAV Defence System)" Blighter Surveillance Systems BSS-1400 (2015).
Google Patents printed version of Fink, US 20140266851 A1 (Mar. 14, 2013)https://patents.google.com/patent/US20140266851A1/en?oq=20140266851.
U.S. Office Action dated Jul. 16, 2021 in commonly assigned U.S. Appl. No. 17/214,413 (47 pages).
U.S. Appl. No. 62/406,834, filed Oct. 11, 2016 of Fox et al.
U.S. Appl. No. 62/727,455, filed Sep. 5, 2018 of Fox et al.

* cited by examiner

COUNTER UNMANNED AERIAL SYSTEM WITH NAVIGATION DATA TO INTERCEPT AND/OR DISABLE AN UNMANNED AERIAL VEHICLE THREAT

CROSS-REFERENCE TO RELATED APPLICATIONS

This application is a continuation of U.S. patent application Ser. No. 17/001,254 filed Aug. 24, 2020, now U.S. patent Ser. No. 11/156,707, which is a continuation of U.S. patent application Ser. No. 16/362,285, filed Mar. 22, 2019; now U.S. Pat. No. 10,795,010, which is a continuation of U.S. patent application Ser. No. 15/967,291, filed Apr. 30, 2018, now U.S. Pat. No. 10,281,570; which is a continuation of U.S. patent application Ser. No. 15/598,112, filed May 17, 2017, now U.S. Pat. No. 9,977,117; which is a continuation of U.S. patent application Ser. No. 14/821,907, filed Aug. 10, 2015, now U.S. Pat. No. 9,689,976; which claims benefit of U.S. Provisional Application No. 62/094,154, filed Dec. 19, 2014. The disclosures of the prior applications are incorporated herein in their entirety by reference.

FIELD

The technology herein relates to an integrated detection and countermeasure solution against unmanned aerial systems, which are commonly referred to as drones.

BACKGROUND

Unmanned aerial systems, which are commonly referred to as drones, have become commercially available to the general public. While there may be many safe commercial and recreational uses for unmanned aerial systems these devices may potentially pose hazards to commercial and general aviation, the public, and private and government property if improperly operated. Furthermore, unmanned aerial systems may be used to violate the privacy of personal, commercial, educational, athletic, entertainment and governmental activities. Most unfortunately unmanned aerial systems may potentially be used in the furtherance of invading privacy, or carrying out terrorist and/or criminal activities. There is a need for a device and method of detecting the approach of an unmanned aerial system towards a location where personal, public, commercial, educational, athletic, entertainment and governmental activities occur and where an unmanned aerial system could potentially be used for invading privacy, or carrying out terrorist and criminal activities. The technology herein provides an integrated detection and countermeasure solution against unmanned aerial systems and offers increased security, privacy, and protection from the threats of violence involving small unmanned aerial vehicles/systems (sUAS) and is applicable to governmental, commercial, private, and public concerns.

SUMMARY

There is provided in accordance with the present technology a system that detects, identifies, tracks, deters and or interdicts small unmanned aerial vehicles/systems (sUAS) from ground level to several thousand feet above ground level. The system disclosed herein is an integrated solution comprising components using: existing technology for a new use; multiplexing hardware components designed for this application; and development of the integrating software which calculates the exact x, y, z coordinates of the subject sUAS; subject sUAS RF signal analysis to determine the most appropriate RF signal characteristics to affect the subject sUAS; precision alignment of high definition electro-optical (EO) sensors and infrared (IR) sensors and image recognition algorithms providing confirmation that the subject sUAS is in violation of airspace authorization. The integration of these components via the herein disclosed combination of software and hardware is novel, not related to existing art in purpose, is non-obvious, and provides a useful solution to uninvited, invasive and potentially hazardous sUAS operations.

The system provides an integrated and diversified solution that can be deployed as a "permanent placement" or mobile system on land, sea, or air platform.

The system may be strategically deployed to monitor the airspace around a protected interest such as a property, place, event or very important person (VIP) offering 360-degree azimuth coverage extending from the receiving antennae of the system out to a maximum lateral distance of about 2 kilometers (6560 feet) and within the lateral boundaries up to a maximum altitude of about 1.5 kilometers (4920 feet) above ground level (AGL).

DETAILED DESCRIPTION

Part Numbers

Figure 1:
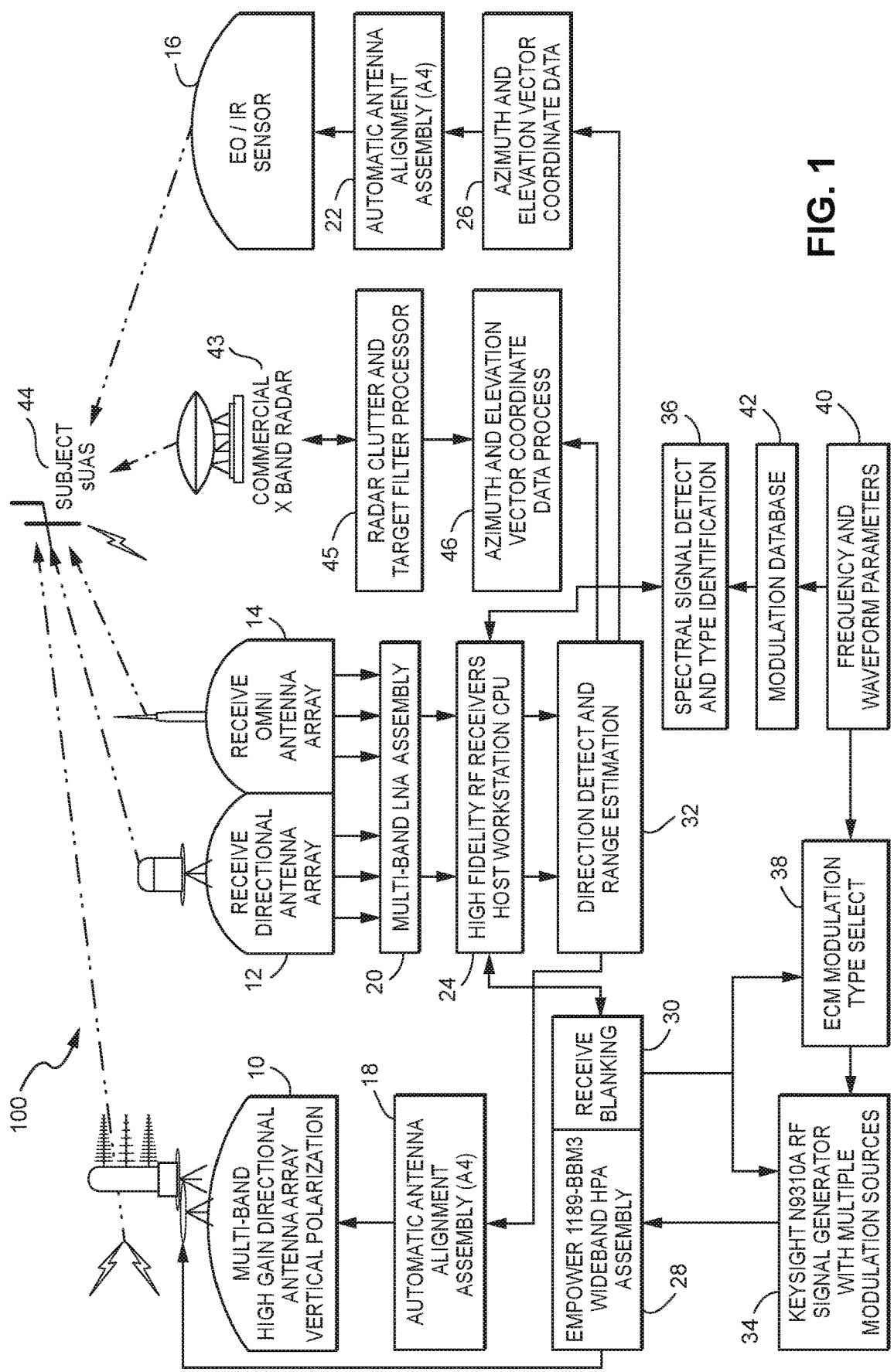
FIG. 1 is a schematic representation of the components and function of an integrated detection and countermeasure system for use against unmanned aerial systems.

10 Transmitting multi band high gain directional antenna array with vertical polarity
12 Receive directional antenna array
14 Receive Omni antenna array
16 EO/IR (Electro Optical/Infra Red) sensor
18 Automatic antenna alignment assembly
20 Multi-band LNA assembly
22 Automatic antenna alignment assembly
24 High fidelity RF receivers/host work station CPU
26 Azimuth and elevation vector coordinate data processor
28 Empower 1189-BBM3 wideband HPA assembly
30 Receive blanking
32 Direction detect and range estimation
34 Key sight N9310A RF signal generator with multiple modulation sources
36 Spectral signals detect and type identification
38 ECM modulation type select
40 Frequency and waveform parameters
42 Modulation database 43 Commercial 4 k X band radar
44 Subject UAS (Unmanned Aerial System)
45 Radar clutter and target filter processor
46 Azimuth and elevation vector coordinate data processor
99 System power and status monitor
100 Entire system
102 Countermeasure and deterrent section of entire system
103 Radio Frequency (RF) detection section of entire system
104 Radar detection section of entire system
105 Electro Optical and Infer Red (EO/IR) detection section of entire system Glossary As used herein and in the claims each of the terms defined in this glossary is understood to have the meaning set forth in this glossary.

Figure 2:
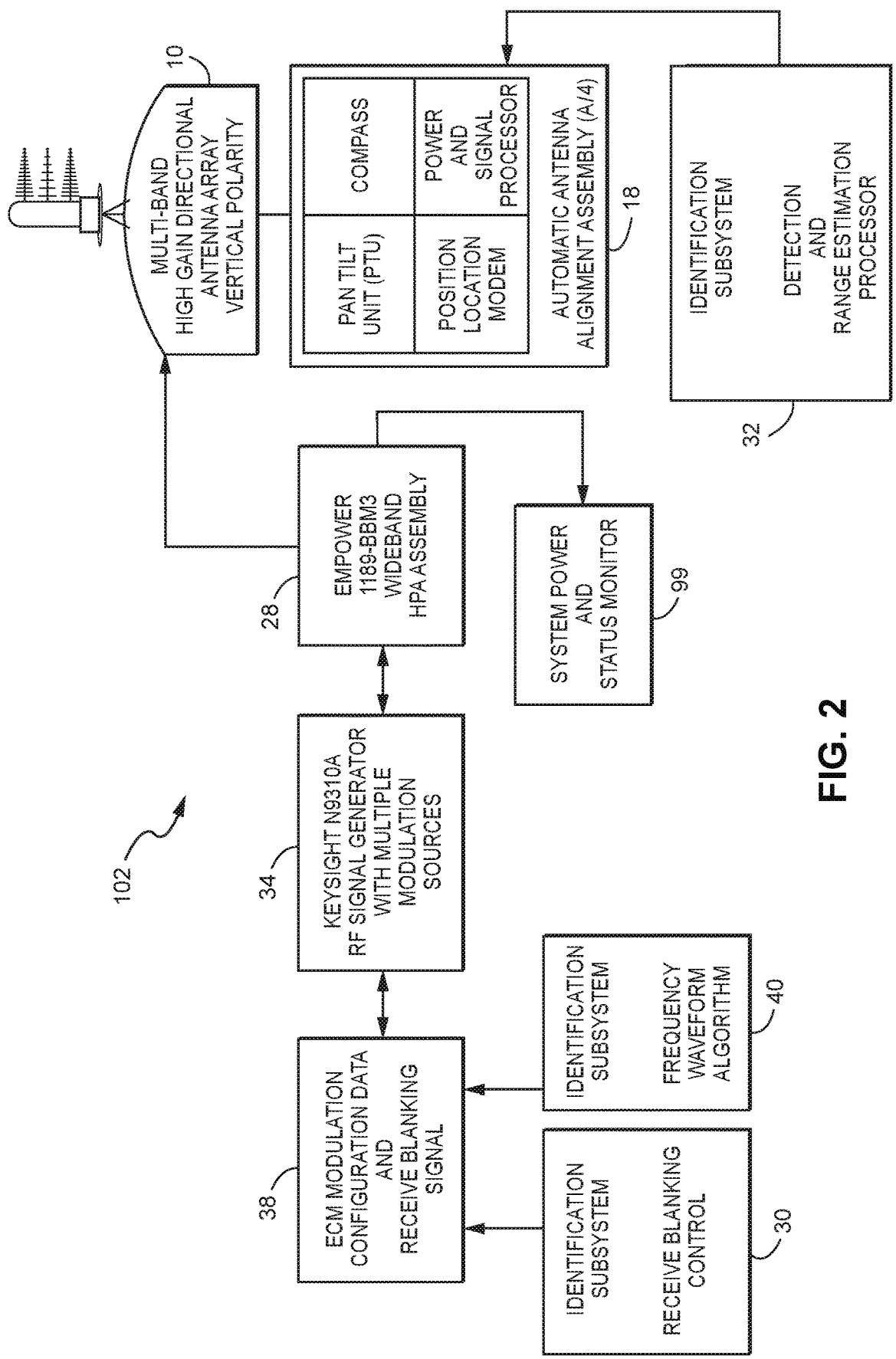
FIG. 2 is a schematic representation of a countermeasure and interdiction to UAS system of the integrated detection and countermeasure system for use against unmanned aerial systems, 44 of FIG. 1.
Figure 3:
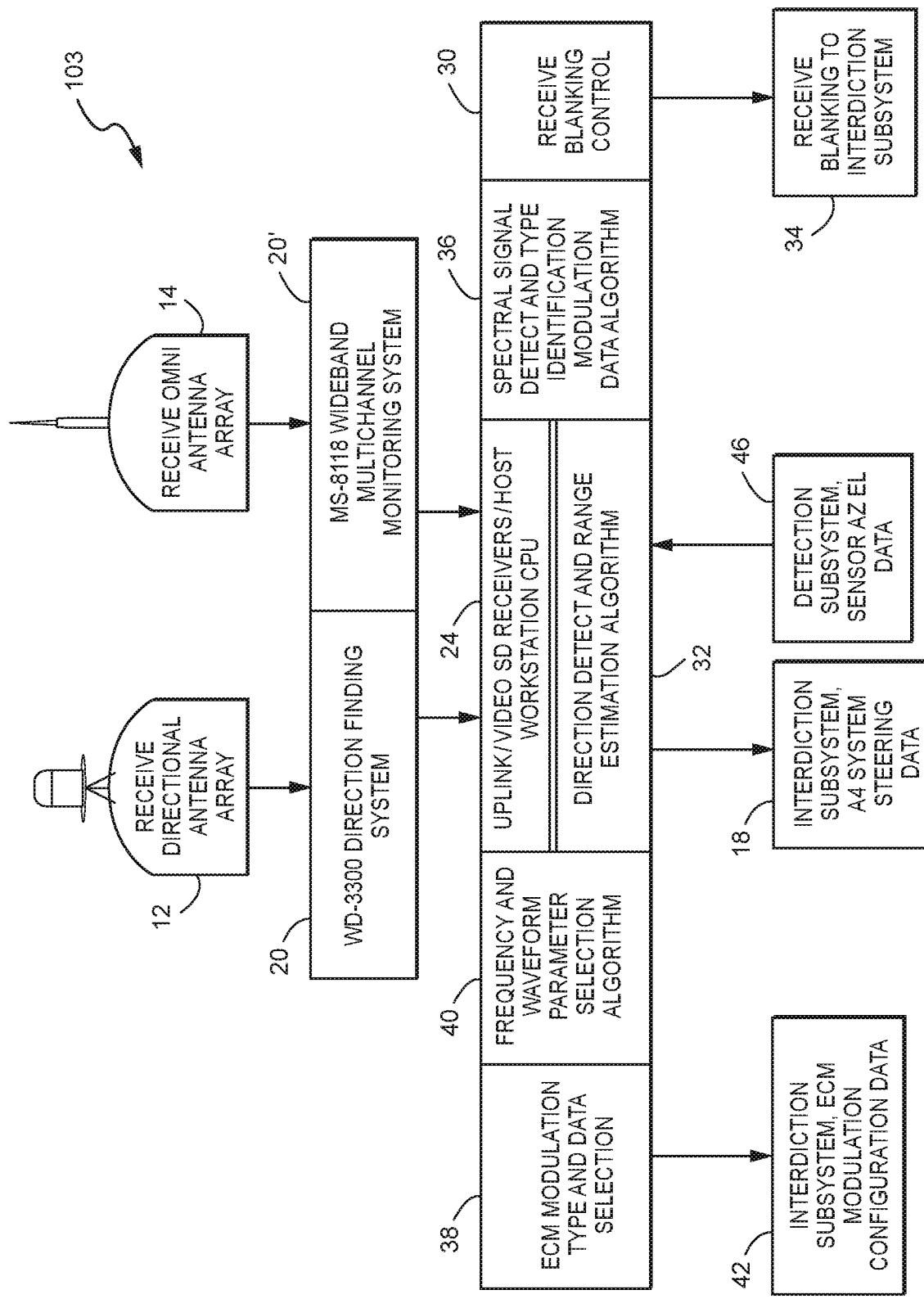
FIG. 3 is a schematic representation of the Radio Frequency (RF) detection system of the integrated detection and countermeasure system for use against unmanned aerial systems, 44 of FIG. 1.
Figure 4:
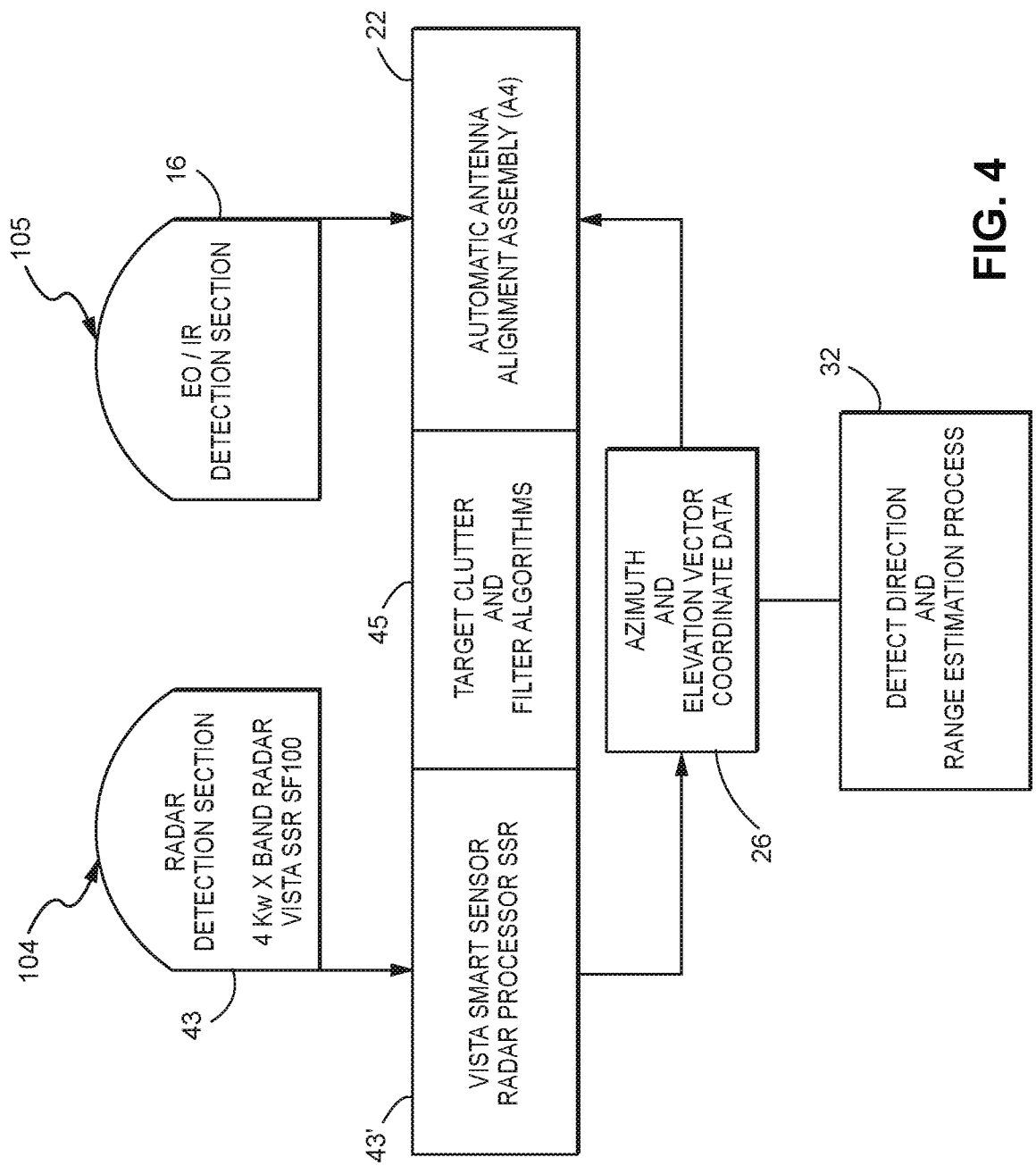
FIG. 4 is a schematic representation of the Radar detection system and Electro Optical and Infer Red (EO/IR) detection system of the integrated detection and countermeasure system for use against unmanned aerial systems, 44 of FIG. 1.

Algorithm—a process or set of rules to be followed in calculations or other problem-solving operations by a computer Automatic Antenna Alignment Assembly—designated as 18 in FIGS. 1, 2 and 3, and as 22 in FIGS. 1 and 4, is specialized electronic equipment specifically designed to automatically point the directional antennae and or camera, laser systems to the desired location, namely a small unmanned aerial vehicles/systems (sUAS) designated as a target 44 in FIG. 1, based on longitude and or latitude information gained or received by the receiving antennae, designated as 12 and 14 in FIGS. 1 and 3, and or radar antennae designated as 43 in FIGS. 1 and 4; this specialized equipment can be purchased from and is proprietary to EnrGies Engineering located in Huntsville, Alabama Azimuth and Elevation Vector Coordinate Data—designated as 26 in FIGS. 1 and 4, is specialized algorithm software that has been developed to be used with a spherical coordinate system for three-dimensional space where three numbers specify the position of a point measured in latitude, longitude and elevation obtained from an EO/IR Sensor designated as 16 in FIGS. 1 and 4 that includes a Laser Range Finder, and/or Radar designated as 43 in FIGS. 1 and 4

Blanking—designated as 30 in FIGS. 1, 2 and 3 is the time between the last radio transmitting signal and the beginning of the next radio transmitting signal C2 Communications—Command and Control Communications links Commercial—relating to or engaged in commerce (i.e. NON-military)

Counter—to offer in response or act in opposition

CUASs2—Counter Unmanned Aerial Systems of Systems, the system used to detect, identify and deter or interdict unmanned aerial vehicles or systems Directional Antenna—designated as 10 in FIGS. 1 and 2, and 12 in FIGS. 1 and 3, a class of directional or beam antenna that radiates greater power in one or more directions allowing for increased performance on transmits and receives and reduced interference from unwanted sources Direction Detection and Range Estimation—designated as 32 in FIGS. 1-4, is specialized algorithm software that has been developed to detect a suspected target or signal of interest and calculated to obtain the azimuth and distance to that target or signal of interest based on data obtained by the Radio Frequency (RF) detection section 103 in FIG. 3, the Radar detection section 104 in FIG. 4, and the Electro Optical and Infer Red (EO/IR) detection section 105 in FIG. 4

DF—designated as 12 in FIGS. 1 and 3, Direction Finding refers to the measurement of the direction from which a received signal was transmitted, this can refer to radio or other forms of wireless communication Drone—designated as 44 in FIG. 1, refers to an unmanned aircraft operated by remote control, allows for human correction (i.e. semi-autonomous), or autonomous, see also UAV, UAS, sUAS, RPA EAR—Export Administration Regulations are regulations that are administered by the United States Department of Commerce and regulate the export of "dual use" items; technology designed for commercial purposes and with potential military applications, such as computers, software, aircraft, and pathogens as well the re-export of items Electro-Optical and Infrared Sensors—designated as 16 in FIGS. 1 and 4, is a combination of a standard high definition video camera capable of viewing in daylight conditions and an infrared video camera capable of viewing in the infrared light perspective; both camera systems can be purchased "Off-The-Shelf" as common technology, one common manufacturer of this type of camera systems is FLIR Systems Electronic Counter Measure (ECM) Modulation Type Select—designated as 38 in FIGS. 1-3 is specialized algorithm software that has been developed to help narrow down the radio frequency identified by a modulation lookup table (defined in this glossary) of the specific unmanned aerial vehicle/system of interest, designated as a target 44 in FIG. 1, utilizing a database library that was created and categorized with the specific radio frequencies common to all unmanned aerial vehicles/systems Emitter—to send or give out a matter of energy EO—Electro-Optics is a branch of electrical engineering and materials science involving components, devices and systems that operate by modification of the optical properties of a material by an electric field, thus it concerns the interaction between the electromagnetic (optical) and the electrical (electronic) states of materials Frequency—the rate at which a vibration occurs that constitutes a wave, either in a material (as in sound waves), or in an electromagnetic field (as in radio waves and light), usually measured per second Frequency and Waveform Parameters—designated as 40 in FIGS. 1-3, Is specialized algorithm software that has been developed to identify unmanned aerial vehicles/systems utilizing a database library that was created and categorized with the specific radio frequency waveform common to all unmanned aerial vehicles/systems IR—infrared is invisible (to the human eye) radiant energy, electromagnetic radiation with longer wavelengths than those of visible light, extending from the nominal red edge of the visible spectrum at 700 nanometers (frequency 430 THz) to 1 mm (300 GHz)

ISR—Intelligence; Surveillance, Reconnaissance is an activity that synchronizes and integrates the planning and operation of sensors, assets, and processing, exploitation, and dissemination systems in direct support of current and future operations ITAR—International Traffic in Arms Regulations is a set of United States government regulations that control the export and import of defense-related articles and services on the United States Munitions List (USML)

Jam or Jammed or Jammers or Jamming—to interfere with or prevent the clear reception of broadcast signals by electronic means to become unworkable or to make unintelligible by sending out interfering signals by any means Laser—a device that emits light through a process of optical amplification based on the stimulated emission of electromagnetic radiation Laser Range Finder—designated as 16 in FIGS. 1 and 4, is a rangefinder which uses a laser beam, usually pulsed, to determine the distance to an object LED—Light-Emitting Diode is a semiconductor device that emits visible light when an electric current passes through it Matrix—an environment in which something develops Matrix Directional Transmit Antenna Array—designated as 10 in FIGS. 1 and 2, Is a signal processing technique used in sensor (Antenna) arrays for directional signal transmission; this is achieved by combining elements in a phased array in such a way that signals at particular angles experience constructive interference while others experience destructive interference; his equipment can be purchased "Off-The-Shelf" and one common manufacturer of this type of equipment is Motorola Mobile Platform (MP)—the mobile Counter Unmanned Aerial System of Systems equipment installed on any vehicle with the intent to move from one location to another location as needed to fulfill a short-term need in the detection, identification and deterrence or interdiction of an unmanned aerial vehicle Modulation—the process of varying one or more properties of a periodic waveform, called the carrier signal, with a modulating signal that typically contains information to be transmitted Modulation Function Generation—designated as 34 in FIGS. 1-3, Is specialized algorithm software that has been developed to transmit (Jam) a specific radio frequency, designated by 38 in FIGS. 1-3 and 42 in FIGS. 1 and 3, which is unique to a specific unmanned aerial vehicles/systems utilizing a database library that was created and categorized with the specific radio frequencies used on all common unmanned aerial vehicles/systems Modulation Lookup Table—designated as 42 in FIGS. 1 and 3, is specialized algorithm software that has been developed to identify the broad range of radio frequencies being used by a specific unmanned aerial vehicle/system of interest, designated as a target 44 in FIG. 1, utilizing a database library that was created and categorized with the specific radio frequencies common to all unmanned aerial vehicles/systems Multi-Band—a communication device that supports multiple radio frequency bands Multiband Low Noise Amplifier (LNA) Assembly—designated as 20 in FIGS. 1 and 3, is a multi-radio frequency electronic amplifier used to amplify possibly very weak signals, for example captured by an antenna Omni-directional Antenna—designated as 14 in FIGS. 1 and 3, a class of antenna which receives or transmits radio wave power uniformly in all directions in one plane, with the radiated power decreasing with elevation angle above or below the plane, dropping to zero on the antenna's axis OTS—Off The Shelf refers to materials or equipment that currently exists and is readily available for purchased or use Permanent Platform (PP)—the installation of the Counter Unmanned Aerial System of Systems equipment at a specific location to fulfill a long-term need in the detection, identification and deterrence or interdiction of an unmanned aerial vehicle Pulse—a single vibration or short burst of sound, electric current, light, or other wave RPA—Remotely Piloted Aircraft, aka UAV, UAS RF—Radio Frequency is a rate of oscillation in the range of around 3 kHz to 300 GHz, which corresponds to the frequency of radio waves, and the alternating currents that carry radio signals Receive Blanking—designated as 30 in FIGS. 1-3, is specialized algorithm software that has been developed to stop the receiving antennae, designated as 12 and 14 in FIGS. 1 and 3, from receiving radio frequency signals during the time that the counter measure transmitting frequency, designated as 34 in FIGS. 1-3, is being transmitted by directional transmitting antennae, designated as 10 in FIGS. 1 and 2, for the purpose of deterrence or interdiction of the suspect unmanned aerial vehicle/system, designated as a target 44 in FIG. 1, identified as a known threat Receive Directional Antenna Array—designated as 12 in FIGS. 1 and 3, refers to multiple receiving antennae arranged such that the superposition of the electromagnetic waves is a predictable electromagnetic field and that the currents running through them are of different amplitudes and phases; this equipment can be purchased "Off-The-Shelf" and one common manufacturer of this type of equipment is Motorola Receive Omni Antenna Array—designated as 14 in FIGS. 1 and 3, is a class of antenna that receives radio wave power uniformly in all directions in one plane; this equipment can be purchased "Off-The-Shelf" and one common manufacturer of this type of equipment is Motorola STC—Slew To Cue, the autonomous actions of electronic, radio or optical sensors to rotate using an automatic antenna alignment assembly designated as 18 in FIGS. 1-3, and 22 in FIGS. 1 and 4 to move and point cameras 16 in FIGS. 1 and 4 and countermeasures 10 in FIGS. 1 and 2 in the direction of a suspect target 44 in FIG. 1, based on input from data processed by components 26 in FIGS. 1 and 4, and 46 in FIGS. 1, 3 and 4, thus, keeping the "cued" targets in view at all times with or without human intervention Spectral Signal—designated as 36 in FIGS. 1 and 3, the frequency spectrum of a time-domain signal is a representation of that signal in the frequency domain Spectral Signal Detection and Type Identification—designated as 36 in FIGS. 1 and 3, is specialized algorithm software that has been developed to detect and identify unmanned aerial vehicles/systems utilizing a database library that was created and categorized with the spectral signatures common to all unmanned aerial vehicles/systems sUAS—designated as 44 in FIG. 1 small Unmanned Aerial System, usually weighing less than 20 kg or 55 lbs.

Target—designated as 44 in FIG. 1, something or someone of interest to be affected by an action or development Target Tracking Log—a graphic or table of coordinates documenting the target's path in space during area of concern Technology—the application of science, especially to industrial or commercial objectives Threat—a declaration or an act of an intention or determination to inflict the destruction of property or harm, punishment, injury or death of person(s)

UAS—designated as 44 in FIG. 1, Unmanned Aerial System, Unmanned Aircraft System (aka UAV, RPA)

UAV—designated as 44 in FIG. 1, Unmanned Aerial Vehicle, Unmanned Aircraft Vehicle (aka UAS, RPA)

Uplink—the part of a network connection used to send, or upload, data from one device to a remote device Uplink Video/Radio Transmitter Assembly—designated as 28 in FIGS. 1 and 2, is a device that will take the received radio or video frequency information from database libraries designated as 36 in FIGS. 1 and 3, 40 in FIGS. 1-3, and 42 in FIGS. 1 and 3 and send it through a radio amplifier designated as 34 in FIGS. 1-3 to a transmitting directional antenna or matrix directional transmit antenna array designated as 10 in FIGS. 1 and 2; this equipment can be purchased "Off-The-Shelf" and one common manufacturer of this type of equipment is Motorola Uplink/Video Standard Definition (SD) Receiver & Host Workstation—designated as 24 in FIGS. 1 and 3, is a connection from the antennae to the video encoder where the information is processed by the main computer network; the uplink equipment can be purchased "Off-The-Shelf" and one common manufacturer of this type of equipment is Cisco Systems; the video receiver and main computer is also "Off-The-Shelf" technology and are readily available from numerous manufacturers Vector—a quantity having direction as well as magnitude, especially as determining the position of one point in space relative to another Watt—the system unit of power, equivalent to one joule per second, corresponding to the power in an electric circuit in which the potential difference is one volt and the current one ampere Waveform—a graphic representation of the shape of a wave that indicates its characteristics as frequency and amplitude Referring to FIGS. 1-4 there are shown schematic representations of the components and function of an integrated detection and countermeasure system 100 for use against unmanned aerial systems 44. A first function of the system is locating and identifying a UAS target. The technology herein provides integrated detection sections 103-105 and deterrent/countermeasure section 102 against small unmanned aerial vehicles/systems (sUAS), which are commonly referred to as drones, in the vicinity of, or approaching the vicinity of a property, place, event or very important person (VIP). All sUAS's have a distinct set of spectral signatures (sound, heat, radar cross section, radio frequency wave pattern) detected by a spectral signal identifier processor 36. This fact is the basis for the detection sections 103-105 of the system 100 and sections 103-105 is the first function of the system. Using a proven high-end direction finding (DF) high fidelity RF receiver 24 coupled with omnidirectional and directional antennae 12, 14 and unique created software of the system when the RF signature of the sUAS flying within the system's detection boundaries is detected, for example within maximum lateral distance of about 2 kilometers (6560 feet) and within the aerial boundaries up to a maximum altitude of about 1.5 kilometers (4920 feet) above ground level (AGL). This element of the system may be augmented and is shown with additional signature detection elements consisting of acoustic and/or radar sensors 43 and electro optical sensors 16. These elements operate with unique software translating discernable signatures into coherent data aiding in the detection and location process. All signature data is then processed to generate a reference azimuth and elevation 26, 46 from the sensor to the subject sUAS 44. The information generated by the systems detection section is then passed electronically to the direction and range estimation processor 32 to yield a target's location. The system 100 uses the hardware and software of the Radio Frequency (RF) detection section 103 to identify the type of sUAS and the associated known and observed radio frequencies signatures required for the sUAS communications and video data exchange.

A second function of the system is providing countermeasures against sUAS that is determined to be a threat in or approaching the vicinity of a property, place, event or VIP. Azimuthal data for a sUAS is determined by the detection section 103-105 of the system. The system's control software/hardware provides this information to the integrated Electro-Optical (EO) and Infrared (IR) sensor 16 which autonomously centers the field of regard of the EO/IR sensor to the known location of the subject sUAS 44. When the visual identification is confirmed to be a sUAS; by either video analytics or human verification, the system of software/hardware will then determine the precise x, y, z coordinates (x=longitude, y=latitude, z=altitude) of the sUAS. This precise location and range information is provided to the countermeasure and deterrent section 102 of the system 100. Using this data the countermeasure and deterrent section 102 computes the RF spectral characteristics that will nullify signals that the sUAS expects to receive. A signal generator 34 produces a tailored signal and a variable strength amplifier 28 generates the output power required; causing the desired effect at the desired range to the subject sUAS 44. The countermeasure and deterrent section 102 broadcasts the unique generated RF waveform using highly directional and focused antennae 10. The system uses Blanking 30 at the time between the last radio transmitting signal and the beginning of the next radio-transmitting signal of the transmitted signal in accordance with the frequency and waveform parameters 40 to avoid negative internal effects to system 103. The system then disables the sUAS sensors, or causes the sUAS navigation system to malfunction due to communication interference causing most sUAS to enter a "Fail Safe Mode" (either land immediately or return to the launch point). This action is sUAS specific and is based on the manufacturer design and sUAS operational capabilities.

The interdict element of a system interdicts the operation of an sUAS initially in a non-destructive manner, increasing to a destructive manner based on the response of the target sUAS. A system may interdict the operation of a sUAS in a non-destructive manner by transmitting a concentrated Radio Frequency (RF) emission tuned to the specific sUAS characteristics identified by the spectral analysis during the detection process. These RF waveforms are then used to disrupt the expected inputs to the onboard controller of the identified sUAS. The video downlink signal is the initial target of the interdiction process. If this interruption is not sufficient to deter the sUAS, the RF transmitter will be tuned to the appropriate control frequency to disrupt the sUAS on-board electronics. These actions will cause most sUAS to enter the Fail Safe Mode (either land immediately or return to the launch point). The technology herein considers the differences based on the manufacturer design and operational capabilities of the sUAS on a case-by-case basis and tailors the countermeasure/deterrent response accordingly.

The countermeasure and deterrent section 102 of the system 100 interdicts the operation of an sUAS in a non-destructive manner by using the non-destructive technology described to generate a interdict transmission signal that is significantly stronger than control signals from an operator of the sUAS. This interdict transmission will have significantly higher gain (Stronger Signal) and target both the sensor and the control electronics of the sUAS. The interdiction process may be augmented with electro-magnetic pulse technology, pulsed laser and is specifically designed to accept other current or future counter-measures used to defeat the sUAS' electronics, motors and or navigation systems. The effects of the higher gain radio transmission will cause amongst other effects, servo-chatter, resulting in the loss of control of the sUAS and disruption of most on-board electronic processes increasing the probability of a forced landing. In addition, a counter sUAS can be dispatched with autonomous navigation data being supplied by the system to locate and intentionally disable the opposing sUAS by flying into it, dropping a net on the threat, covering it with spray foam or liquid or capturing the opposing sUAS.

The system will use direction finding (DF) equipment 12, 16 to search for the radio communications link of an airborne sUAS 44, commonly referred to as a drone. Integrating multiple Direction Finding (DF) equipment 26, 46 to the system will increase the precision in obtaining the azimuth that the sUAS is flying. Integrating radar equipment 43 provided with a radar clutter and target filter processor 45, with the direction finding (DF) equipment will provide the ability to determine with greater accuracy the altitude and azimuth of the sUAS 44 at the time of discovery and during the time it remains within the systems detection boundaries.

When the DF equipment 26, 46 has detected a communication link of a sUAS within the system boundaries, the receive host workstation 24 will analyze the radio frequency wave signature and confirm that the RF detected is from a sUAS. This process also applies when a radar unit 43 is integrated with the DF equipment.

The information obtained from DF 26, 46 and or radar unit 43 is then sent to the direction detect and range estimation unit 32 where algorithms will be used to send sUAS location coordinates to the Automatic Antenna Alignment Assembly (A4) 22, 18. Put another way, using Slew To Cue, the autonomous actions of electronic, radio or optical sensors to rotate using an automatic antenna alignment assembly 18, 22 to move and point cameras 16 and countermeasures in the direction of a suspect target 44 based on input from data processed by the azimuth and elevation unit 26 46, thus, keeping the "cued" targets in view at all times with or without human intervention. This information will then direct the Automatic Antenna Alignment Assembly (A4) 22 to point the Electro-Optical and Laser Range Finding unit 16 at the sUAS to allow for visual confirmation, distance and elevation of the sUAS to be known.

The information obtained by the Laser Range Finding equipment will be sent to the Azimuth and Elevation Vector Coordinate Data unit 26 which will send exact azimuth and elevation information to the A4 system 18 controlling the Matrix Directional Transmit Antenna Array 10 via the Direction Detect and Range Estimation unit 32.

When the communications link between the subject sUAS and its' operator is detected by the Radio Frequency (RF) detection section 103 of the system the information is passed through the Multiband LNA Assembly 20 and through the Uplink Receive Host Workstation 24. The information is then sent to the Spectral Signal Detect and Type Identification unit 36 where the type of sUAS is determined based on a known database containing Spectral Signal Wave information 36. When the Spectral Signal Wave information is known the information is sent to the Frequency and Wave Form Parameters unit 40 where the analyzed RF data is sent to the Modulation Look Up Table 42. When the Modulation information is known the information is then sent to the ECM Modulation Type Select unit 38.

The selected modulation waveform is then sent to the Uplink Video Transmitter Assembly 28 that unit works in conjunction with the Receive Blanking unit 30. When the Uplink Video Transmitter 28 is transmitting a radio signal the Receive Blanking unit 30 will force the DF antennae 12, 14 to stop receiving the radio frequency being transmitted by the Matrix Directional Transmit Antenna Array 10. The radio frequency selected to disrupt the communication link of the sUAS with its' operator is then transmitted by the Transmitter Assembly 28 using the Matrix Directional Transmit Antenna Array 10 aimed at the sUAS 44 via the Automatic Antenna Alignment Assembly 18.

While the invention has been described with reference to certain exemplary embodiments, obvious modifications and alterations are possible by those skilled in the related art. Therefore, it is intended that the invention include all such modifications and alterations to the full extent that they come within the scope of the following claims or the equivalents thereof.

The invention claimed is:

1. A system, comprising:
   plural ground-based sensors configured to determine location and at least one characteristic of an unmanned aerial system (UAS) in flight, the ground-based sensors comprising (a) at least a radar and (b) an image sensor comprising at least one electro optical sensor and/or at least one infrared sensor; and
   at least one ground-based computer processor connected to the ground-based sensors and programmed to perform operations comprising:
      in response to data from the plural ground-based sensors, determining whether the UAS in flight is a threat that is in a vicinity of a property, place, event or person or is approaching the vicinity of the property, place, event or person, and
      conditioned on determining the UAS in flight is a threat in or approaching the vicinity of a property, place, event or person, countering the UAS in flight by dispatching a counterdrone unmanned aerial system (UAS) having electronics, a motor and a navigation system, with autonomous navigation data supplied by the system, to counter the UAS in flight,
      wherein the counterdrone UAS weighs less than 55 pounds.

2. A non-transitory storage device operatively coupled to at least one processor of a ground-based multi-sensor detection system, the non-transitory storage device configured to store unmanned aerial system (UAS) flight information for processing by the at least one processor, the stored unmanned aerial system (UAS) flight information comprising:
   radar data comprising at least location coordinates indicating tracked positions of an unmanned aerial system (UAS) in flight;
   range finder data indicating range, azimuth and elevation of the UAS in flight, and
   optical image data indicating visual confirmation of the UAS in flight;
   the radar data, the range finder data and the optical image data being configured to enable determining whether the UAS in flight is a threat based on the tracked positions, azimuth data, elevation data, and range, and in response to determining the UAS is a threat, dispatching a counterdrone unmanned aerial system (UAS) having electronics, a motor and a navigation system, with autonomous navigation data supplied by the ground-based multi-sensor detection system to counter the UAS in flight,
   wherein the counterdrone UAS weighs less than 55 pounds.

3. A ground-based integrated detection and countermeasure multi-sensor system for detecting, identifying and interdicting an unmanned aerial system (UAS), the ground-based integrated detection and countermeasure multi-sensor system comprising:

ground-based sensors including:
a radar system,
a camera system, and
a range finder,
the ground-based sensors configured for collecting, independently or in conjunction, sensor data of a UAS in flight;
a sensor processor connected to the ground-based sensors, the sensor processor configured to process and analyze the sensor data of the UAS in flight:
a database library configured for storing known system generated multi-sensor data or state data generated by local and/or remote sources of the UAS in flight; and
a computer operatively connected to the sensor processor that, at least in part in response to the sensor processor processing and analyzing, countering the UAS in flight by dispatching a counterdrone unmanned aerial system (SUAS) having electronics, a motor and a navigation system, with autonomous navigation data being supplied by the system to counter the UAS in flight,
wherein the counterdrone SUAS weighs less than 55 pounds.

4. The ground-based integrated detection and countermeasure multi-sensor system of claim 3 wherein the camera system is configured to detect optical and/or infrared images.

5. The ground-based integrated detection and countermeasure multi-sensor system of claim 3 wherein the sensor processor is configured to detect and classify the counterdrone UAS in flight in response to the sensor data.

6. The ground-based integrated detection and countermeasure multi-sensor system of claim 5 wherein the sensor processor includes a direction detect and range estimator.

7. The ground-based integrated detection and countermeasure multi-sensor system of claim 3 further including a ground-based omnidirectional antenna connected to an RF receiver configured to detect RF signals from the UAS in flight, and the sensor processor is connected to the RF receiver.

8. The ground-based integrated detection and countermeasure multi-sensor system of claim 7 wherein the sensor processor is configured to analyze the RF signals to determine at least one of bearing, altitude, location, or identification.

9. The ground-based integrated detection and countermeasure multi-sensor system of claim 3 wherein the sensor processor is configured to determine if the UAS in flight approaches a vicinity of a property, place, event, or VIP.

10. The ground-based integrated detection and countermeasure multi-sensor system of claim 3 wherein the sensor processor is configured to receive imagery from the camera system and azimuth, elevation, and distance from the range finder.

11. The ground-based integrated detection and countermeasure multi-sensor system of claim 3 wherein the sensor processor provides sensor data to yield a UAS ID/classification with or without a human in the loop.

12. The ground-based integrated detection and countermeasure multi-sensor system of claim 3 wherein the system includes a comparator that compares sensed data to a database library maintained or accessed by sensor processor to identify the UAS in flight.

13. The ground-based integrated detection and countermeasure multi-sensor system of claim 3 wherein the sensor processor enables a slew to cue to autonomously rotate at least one sensor in a direction of the UAS in flight, keeping the UAS in flight in view of the at least one sensor.

14. The ground-based integrated detection and countermeasure multi-sensor system of claim 3 wherein the computer comprises a CPU that operates in conjunction with modulation type and data selection and frequency and waveform parameter selection.

15. A ground-based multi-sensor system comprising:
a sensor processor configured to determine flight of an unmanned aerial vehicle (UAV) in flight using radar, optical imagery, and range finder sensor data:
an omnidirectional or directional radio frequency antenna configured for sending and/or receiving RF to/from the UAV in flight; and
a counterdrone unmanned aerial system (UAS) comprising electronics, a motor and a navigation system, the counter UAS dispatched with autonomous navigation data supplied by the system, to counter the UAV in flight,
wherein the counterdrone UAS weighs less than 55 pounds.

16. A ground-based system including a non-transitory computer readable storage medium storing processor-executable software, the non-transitory computer readable storage medium operatively coupled to at least one processor of a ground-based multi-sensor detection system, the non-transitory computer readable storage medium also storing processor-executable data, the stored software operating the at least one processor to perform operations comprising dispatching a counterdrone unmanned aerial system (SUAS) to counter an unmanned aerial vehicle target in flight, the stored software and data comprising:
radar data comprising location coordinates indicating tracked target positions of an unmanned aerial vehicle target in flight;
Range Finder data indicating target coordinates of the unmanned aerial vehicle target in flight; and
Optical image data of the unmanned aerial vehicle target in flight;
the radar data, the Range Finder data and the optical image data enabling the at least one processor to compute based on at least the target locations coordinates, a target classification, and bearing and tracked target flight profile and to further enable the at least one processor to dispatch the counterdrone UAS with autonomous navigation data being supplied by the system to counter the unmanned aerial vehicle target in flight from ground level to several thousand feet above ground level,
wherein the counterdrone UAS weighs less than 55 pounds.

17. The ground-based system of claim 16 wherein the processor-executable software is configured to control the at least one processor to detect additional data produced remotely from one or more sensors including radar, radio frequency receiver, radio frequency, omnidirectional or directional antenna, Range Finder and optical imaging.

18. The ground-based system of claim 16 wherein interdicting comprises initially interdicting the unmanned aerial vehicle target in a non-destructive manner, and increasing to interdicting the unmanned aerial vehicle target in a destructive manner.

19. The ground-based system of claim 16 wherein the software is configured to enable the at least one processor to compute location based on a spherical coordinate system where three coordinates specify position of the UAS in flight in three-dimensional space.

20. The ground-based system of claim 16 wherein the system comprises at least one electronic countermeasure.

21. The ground-based system of claim 16 wherein the system is configured to perform Intelligence, Surveillance, and Reconnaissance (ISR).

22. The ground-based system of claim 16 wherein the counterdrone UAS weighs less than 20 kilograms.

\* \* \* \* \*